(12) United States Patent
Hutton

(10) Patent No.: US 7,458,122 B2
(45) Date of Patent: Dec. 2, 2008

(54) AUTOMATED PASSENGER BOARDING BRIDGE ALIGNMENT SYSTEM AND METHOD WITH MANUAL IDENTIFICATION OF AIRCRAFT DOORWAY POSITION

(75) Inventor: Neil Hutton, Ottawa (CA)

(73) Assignee: DEW Engineering and Development Limited, Ottawa, Ontario (CA)

( * ) Notice: Subject to any disclaimer, the term of this patent is extended or adjusted under 35 U.S.C. 154(b) by 290 days.

(21) Appl. No.: 11/157,938

(22) Filed: Jun. 22, 2005

(65) Prior Publication Data

US 2006/0288503 A1 Dec. 28, 2006

(51) Int. Cl.
*G08G 5/00* (2006.01)
*E01D 15/00* (2006.01)
(52) U.S. Cl. .............. 14/71.5; 340/958; 340/686.2; 340/686.6
(58) Field of Classification Search ............... 14/71.5, 14/71.1, 69.5; 340/958
See application file for complete search history.

(56) References Cited

U.S. PATENT DOCUMENTS

| | | | | |
|---|---|---|---|---|
| 5,226,204 A | * | 7/1993 | Schoenberger et al. | 14/71.5 |
| 5,552,983 A | * | 9/1996 | Thornberg et al. | 701/23 |
| 5,734,736 A | * | 3/1998 | Palmer et al. | 382/103 |
| 5,855,035 A | * | 1/1999 | Streeter et al. | 14/71.5 |
| 6,637,063 B1 | | 10/2003 | Hutton et al. | |
| 6,742,210 B2 | | 6/2004 | Hutton et al. | |
| 6,757,927 B2 | | 7/2004 | Hutton et al. | |
| 6,866,232 B1 | * | 3/2005 | Finney | 244/172.4 |
| 6,907,635 B2 | | 6/2005 | Hutton et al. | |
| 7,137,162 B2 | * | 11/2006 | Spencer et al. | 14/71.5 |
| 2006/0277699 A1 | | 12/2006 | Hutton | |
| 2006/0287780 A1 | | 12/2006 | Hutton | |
| 2006/0288502 A1 | | 12/2006 | Hutton | |

OTHER PUBLICATIONS

U.S. Appl. No. 11/518,178, Hutton.
U.S. Appl. No. 11/589,754, Hutton.
U.S. Appl. No. 11/519,968, Hutton.

* cited by examiner

*Primary Examiner*—Raymond W Addie
(74) *Attorney, Agent, or Firm*—Freedman & Associates

(57) ABSTRACT

A system for aligning an aircraft-engaging end of a passenger boarding bridge to a doorway along a lateral surface of an aircraft includes an imager disposed at a location that is remote from the aircraft for capturing an image of a portion of the lateral surface of the aircraft and for providing image data relating to the captured image. A receiver is located aboard the aircraft for receiving a signal including the image data relating to the captured image. In addition, a display device also is located aboard the aircraft and in communication with the receiver, the display device for receiving the image data from the receiver and for displaying to a user aboard the aircraft the image data in a human intelligible form. A user interface located aboard the aircraft is provided for receiving from the user an input signal including an indication of a location of the doorway relative to the displayed image data, and for providing data relating to the input signal. A processor is also provided for determining a location of the doorway in dependence upon the data relating to the input signal and the image data, and for providing a control signal relating to the determined location of the doorway.

13 Claims, 5 Drawing Sheets

US 7,458,122 B2

AUTOMATED PASSENGER BOARDING BRIDGE ALIGNMENT SYSTEM AND METHOD WITH MANUAL IDENTIFICATION OF AIRCRAFT DOORWAY POSITION

FIELD OF THE INVENTION

The instant invention relates generally to a system and method for aligning a passenger boarding bridge to a doorway that is disposed along a lateral surface of an aircraft, and more particularly to an automated passenger boarding bridge alignment system and method with manual identification of aircraft doorway position.

BACKGROUND

In order to make aircraft passengers comfortable, and in order to transport them between an airport terminal building and an aircraft in such a way that they are protected from weather and other environmental influences, passenger boarding bridges are used which can be telescopically extended and the height of which is adjustable. For instance, an apron drive bridge in present day use includes a plurality of adjustable modules, including: a rotunda, a telescopic tunnel, a bubble section, a cab, and elevating columns with wheel carriage. Manual, semi-automated and fully-automated bridge alignment systems are known for adjusting the position of the passenger boarding bridge relative to an aircraft, for instance to compensate for different sized aircraft and to compensate for imprecise parking of an aircraft at an airport terminal.

Automated bridge alignment systems provide a number of advantages compared to manual and semi-automated systems. For instance, automated bridge alignment systems do not require a human operator, and therefore the costs that are associated with training and paying the salaries of human bridge operators are reduced. Furthermore, an automated bridge alignment system is always standing by to control the passenger boarding bridge as soon as an aircraft comes to a stop. Accordingly, delays associated with dispatching a human operator to perform a bridge alignment operation are eliminated, particularly during periods of heavy aircraft travel.

Of course, automated bridge alignment systems require accurate and precise identification regarding the position of the doorway to which the passenger boarding bridge is to be aligned. It is a disadvantage of known automated bridge alignment systems that environmental conditions, surface marking of the aircraft, incorrect identification of aircraft model, etc. may make it impossible to identify the doorway position to within a predetermined tolerance for error. In such a case, typically it is necessary to dispatch a human bridge operator to complete the alignment operation in a manual fashion. Unfortunately, when automated bridge alignment systems are used routinely, an airport is likely to maintain only a relatively small pool of human operators on call. When the doorway position cannot be determined, unacceptable delays are expected due to the time that is required for a bridge operator to become available and arrive at the passenger boarding bridge. In addition, manual bridge alignment typically requires more time to perform than does automated bridge alignment, which adds further to the delay. Such delays not only inconvenience passengers, but they also affect flight scheduling and scheduling of ground service resources at the gate.

It would be advantageous to provide a system and method that overcomes at least some of the above-mentioned limitations of the prior art.

SUMMARY OF EMBODIMENTS OF THE INVENTION

In accordance with an aspect of the instant invention there is provided a system for aligning an aircraft-engaging end of a passenger boarding bridge to a doorway disposed along a lateral surface of an aircraft, comprising: an imager disposed at a location that is remote from the aircraft for capturing an image of a portion of the lateral surface of the aircraft and for providing image data relating to the captured image; a first receiver disposed aboard the aircraft for receiving a first signal including the image data relating to the captured image; a display device disposed aboard the aircraft and in communication with the first receiver, the display device for receiving the image data from the first receiver and for displaying to a user aboard the aircraft the image data in a human intelligible form; a user interface disposed aboard the aircraft for receiving from the user an input signal comprising an indication of a location of the doorway relative to the displayed image data, and for providing data relating to the input signal; and, a processor for determining a location of the doorway in dependence upon the data relating to the input signal and the image data, and for providing a control signal relating to the determined location of the doorway.

In accordance with another aspect of the instant invention there is provided a method of aligning an aircraft-engaging end of a passenger boarding bridge to a doorway disposed along a lateral surface of an aircraft, comprising: capturing an image of a first portion of the lateral surface using an imager disposed at a location remote from the aircraft; processing data relating to the image of the first portion of the lateral surface to identify a feature that is indicative of a location of the doorway; when a feature that is indicative of a location of the doorway is not identified, displaying the image of the first portion of the lateral surface to a user; receiving from the user an indication relating to the location of the doorway relative to the image of the first portion of the lateral surface; and, identifying a feature indicative of a location of the doorway in dependence upon the indication from the user and the data relating to the image of the first portion of the lateral surface.

In accordance with another aspect of the instant invention there is provided a system for aligning an aircraft-engaging end of a passenger boarding bridge to a doorway disposed along a lateral surface of an aircraft, comprising: an imager disposed at a location that is remote from the aircraft for capturing an image of a portion of the lateral surface of the aircraft and for providing image data relating to the captured image; a first receiver disposed at a location that is remote from both the passenger boarding bridge and the aircraft, for receiving a first signal including the image data relating to the captured image; a display device disposed at the location that is remote from both the passenger boarding bridge and the aircraft and in communication with the first receiver, the display device for receiving the image data from the first receiver and for displaying to a user the image data in a human intelligible form; a user interface disposed at the location that is remote from both the passenger boarding bridge and the aircraft for receiving from the user an input signal comprising an indication of a location of the doorway relative to the displayed image data, and for providing data relating to the input signal; and, a processor for determining a location of the doorway in dependence upon the data relating to the input signal and the image data, and for providing a control signal relating to the determined location of the doorway.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
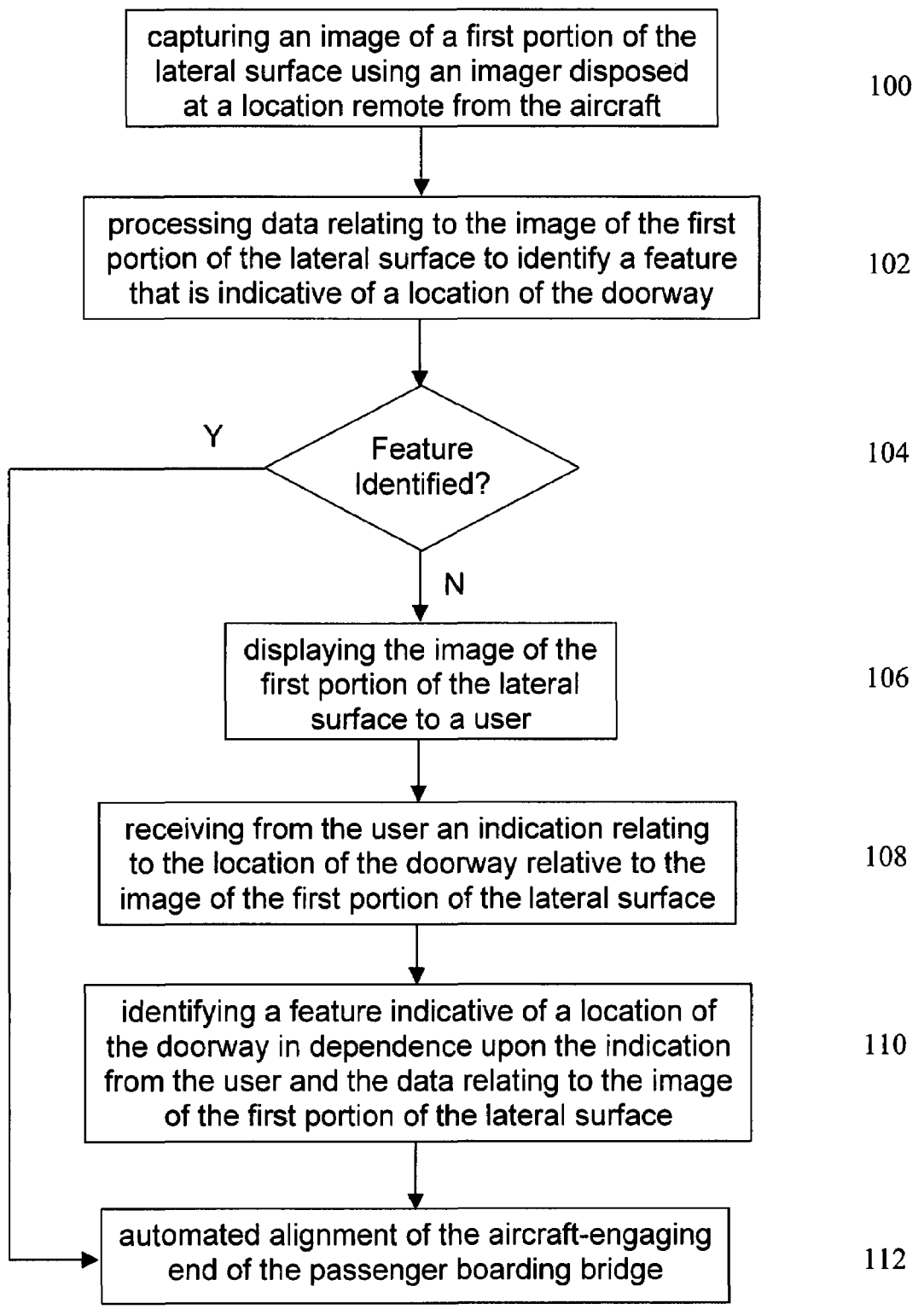
FIG. 1 is a simplified flow diagram of a method of automatically aligning an aircraft-engaging end of a passenger boarding bridge to a doorway disposed along a lateral surface of an aircraft, according to an embodiment of the instant invention.

Referring to FIG. 1, shown is a simplified flow diagram of a method of automatically aligning an aircraft-engaging end of a passenger boarding bridge to a doorway disposed along a lateral surface of an aircraft, according to an embodiment of the instant invention. At step 100, an image of a first portion of the lateral surface of the aircraft is captured using an imager disposed at a location that is remote from the aircraft. For instance, the imager is disposed near the aircraft-engaging end of the passenger boarding bridge. Some non-limiting examples of imager types that are suitable for use with this method include: a digital still camera; a digital video camera, etc. At step 102, data relating to the captured image is processed to identify a feature that is indicative of a location of the doorway. For instance, image data is provided from the imager to a processor of an automated bridge controller. Features that may be identified include but are not limited to: the door outline; the doorsill; the door handle; the door window, etc. At decision step 104, it is determined whether a feature that is indicative of a location of the doorway is identified. When a feature that is indicative of a location of the doorway is not identified, then at step 106 the image of the first portion of the lateral surface is displayed to a user aboard the aircraft. At step 108 an indication from the user is received, the indication relating to the location of the doorway relative to the image of the first portion of the lateral surface. At step 110, a feature indicative of a location of the doorway is identified in dependence upon the indication from the user and the data relating to the image of the first portion of the lateral surface. The method terminates at step 112, and automated alignment of the aircraft-engaging end of the passenger boarding bridge occurs. If at decision step 104 if it is determined that a feature that is indicative of a location of the doorway is identified, then the method terminates at step 112, and automated alignment of the aircraft-engaging end of the passenger boarding bridge occurs.

Optionally, at step 106 the image of the first portion of the lateral surface is displayed to a user at a remote location that is not aboard the aircraft. For instance, the user is located in a control room within the airport terminal building or at another remote location. In this way, one user may assist with the alignment of a plurality of passenger boarding bridges at a same airport or at different airports without actually being required to go to the different passenger boarding bridges. In the examples provided below, it is assumed that the user is aboard the aircraft, but it should be understood that optionally the user is located at a remote location that is not aboard the aircraft.

Figure 2:
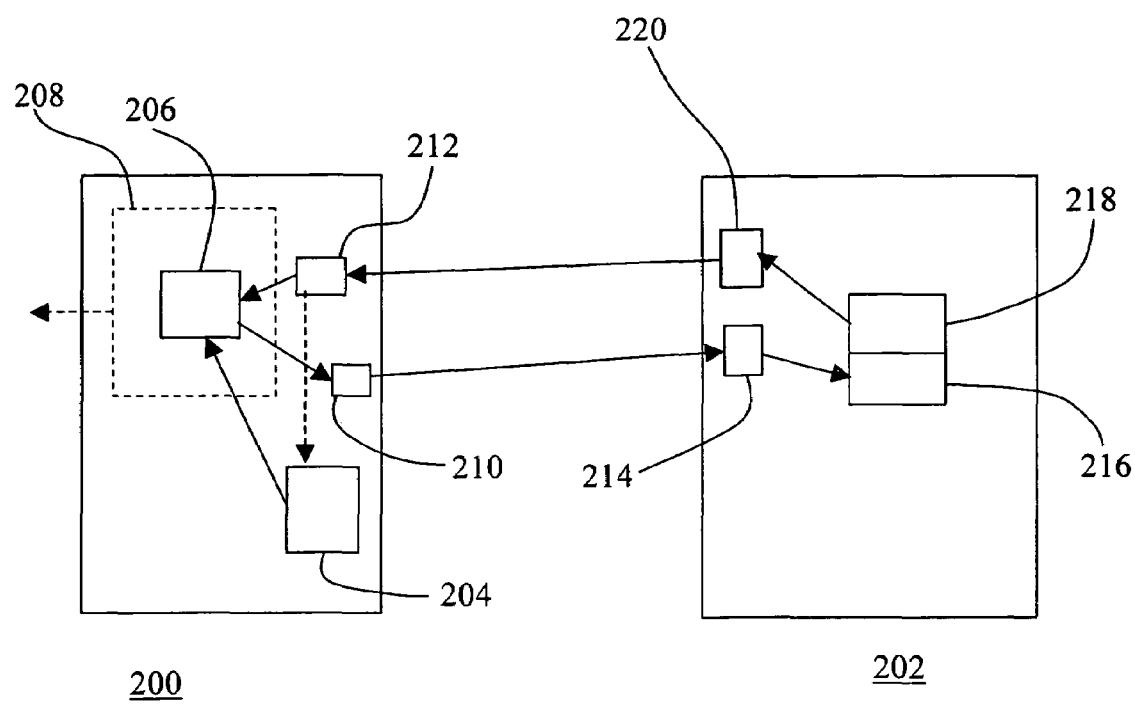
FIG. 2 is a simplified block diagram of a system according to an embodiment of the instant invention.

Referring now to FIG. 2, shown is a simplified block diagram of a system according to an embodiment of the instant invention. The system includes components shown generally at 200, which are disposed at a location that is remote from the aircraft, and components shown generally at 202, which are disposed aboard the aircraft. By way of one non-limiting example, which is provided for illustrative purposes only and is not intended to in any way limit the scope of the invention, the components 200 are disposed near an aircraft-engaging end of a passenger boarding bridge, and the components 202 are disposed in the cockpit area of an aircraft. The components 200 include an imager 204, a processor 206 such as for instance a processor of an automated bridge controller 208, a transmitter 210 and a receiver 212. The components 202 include a receiver 214, a display device 216, a user interface 218 and a transmitter 220. Optionally, the components 200 also include at least a light (not shown) for illuminating the lateral surface of the aircraft including the doorway when operating under poor lighting conditions. For instance, a light source such as for instance a bank of lights is provided for illuminating the lateral surface of the aircraft including the doorway during nighttime operation. Further optionally, a plurality of light sources, such as for instance a plurality of light banks, is provided to support operation of the system under a variety of poor lighting conditions. For instance, two or more banks of lights are used simultaneously to illuminate the lateral surface of the aircraft including the doorway when operating in rainy or snowy conditions.

Referring still to FIG. 2, the imager 204 is disposed for capturing an image of a lateral surface of an aircraft including a doorway to which the aircraft-engaging end of the passenger boarding bridge is to be aligned. Optionally, the imager is disposed at the aircraft-engaging end of the passenger boarding bridge, or at some other location such as along a terminal building wall near the passenger boarding bridge. The imager 204 is provided in the form of, for instance, a digital still camera, a digital video camera, etc. Of course, any other imager that is suitable for capturing an image of the lateral surface of an aircraft may be used. During use, the imager 204 provides image data to the processor 206. The processor 206 processes the image data to identify a feature indicative of a location of the doorway. If the location of the doorway is determined, to within known threshold tolerances, then the processor 206 provides a signal for actuating an automated alignment operation of the automated bridge controller 208. If the location of the doorway is not determined, then the processor provides a signal including image data to the transmitter 210, which then wirelessly transmits a signal including the image data to a receiver 214 aboard the aircraft. An output signal is provided from the receiver 214 to the display device 216. The display device displays the image data in a human intelligible form to the user aboard the aircraft. The user aboard the aircraft, such as for instance the aircraft pilot, uses the user interface 218 disposed aboard the aircraft to provide an indication relating to the location of the doorway relative to the displayed image. The user interface 218 provides to the transmitter 220 an output signal, including data relating to the indication provided by the user aboard the aircraft. The transmitter 220 transmits a signal to the receiver 212, which receives the signal and provides an output signal to the processor 206. In the instant example, the processor 206 is a processor of an automated bridge controller 208. The processor 206 then identifies the feature indicative of a location of the doorway in dependence upon the indication from the user and the data relating to the image of the lateral surface.

Any suitable combinations of transmitters 210/220 and receivers 212/214 may be used, such as for instance a radio-frequency receiver/transmitter pair or an optical receiver/transmitter. When a plurality of passenger boarding bridges, and therefore a plurality of transmitters, is installed at an airport terminal, optionally each radio-frequency transmitter transmits using a different frequency in order to reduce interference and cross-talk. In the case of optical transmitters, any suitable wavelength that is selected from the infrared, visible and ultra-violet regions of the electromagnetic spectrum may be used. Since optical transmitters are highly directional, and accordingly the chances of interference or cross-talk is low, optionally each transmitter uses a different wavelength or a same wavelength.

During use, the user provides the indication by manipulating a joystick or another direction indicating device, and preferably by also depressing a button, by toggling or throwing a switch, by providing a biometric input signal to a biometric information reader or by providing a security token to a token reader. The direction manipulating device, for example a joystick, is used to indicate in which direction the processor should "look" to find the doorway. Preferably, the indication also includes information relating to a distance to the doorway relative to, for example, the center of the image being displayed. Once the indication of direction and preferably distance to the doorway has been provided, the user signals an end to the indication by depressing a button, etc. The direction indicating device and/or the buttons or switches optionally are mechanical or electronic or virtual in nature. Of course, virtual buttons require a touch sensitive display screen, a pointing device such as a mouse, a trackball, a track pad or another pointing device, or other similar technology in order to receive an input signal from the user. Optionally, the user must provide a biometric sample or provide a security token before the system will accept the indication, as a precaution against unauthorized use. Further optionally, the user interface 218 includes an "emergency stop button" that remains active during the automated alignment function. In this way, the user may continue to monitor the displayed image and at any time provide a stop command by actuating the "emergency stop button", so as to cause the automated bridge controller to disable the automated alignment function.

Figure 3:
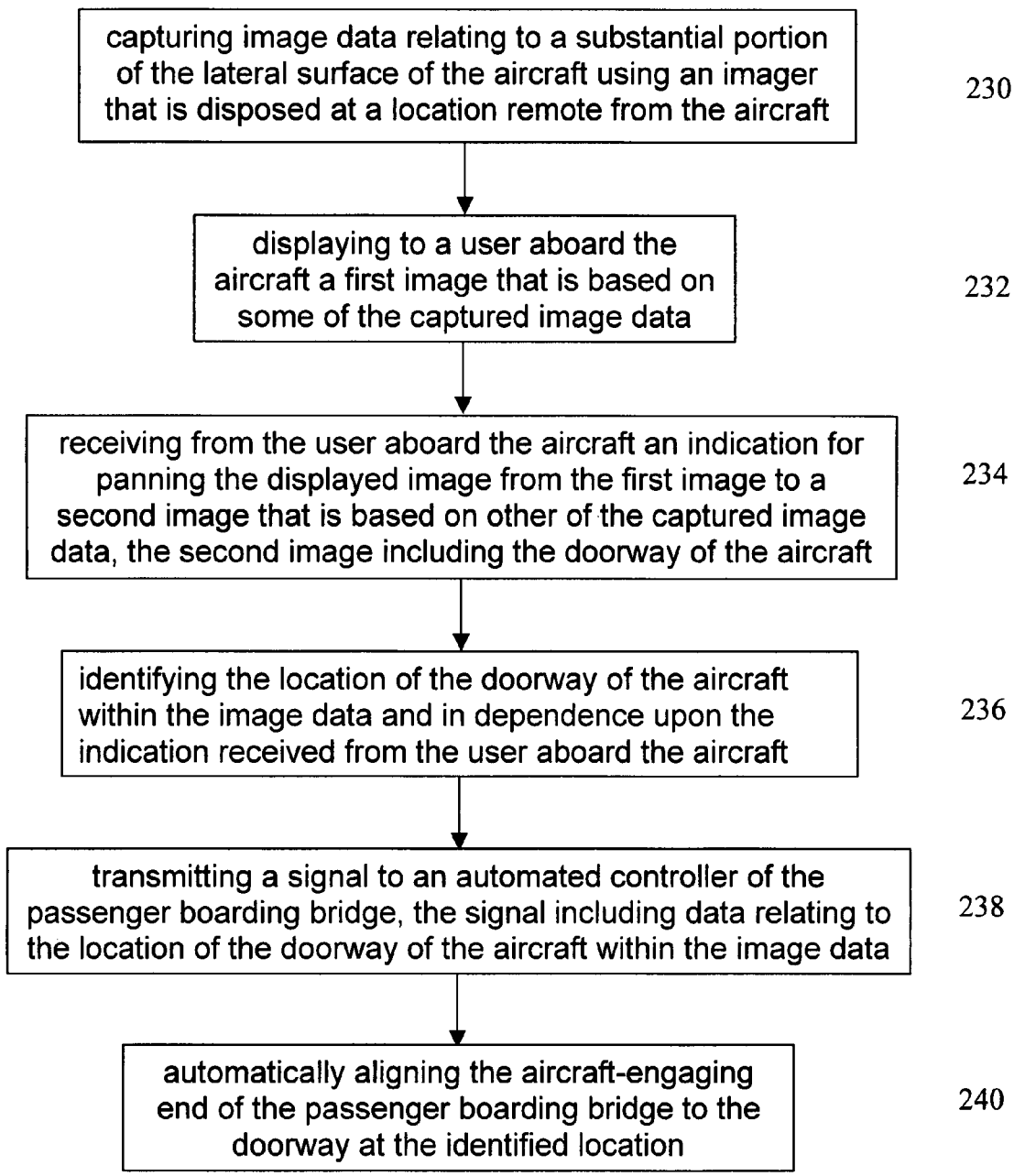
FIG. 3 is a simplified flow diagram of a method of automatically aligning an aircraft-engaging end of a passenger boarding bridge to a doorway disposed along a lateral surface of an aircraft, according to an embodiment of the instant invention.
Figure 4:
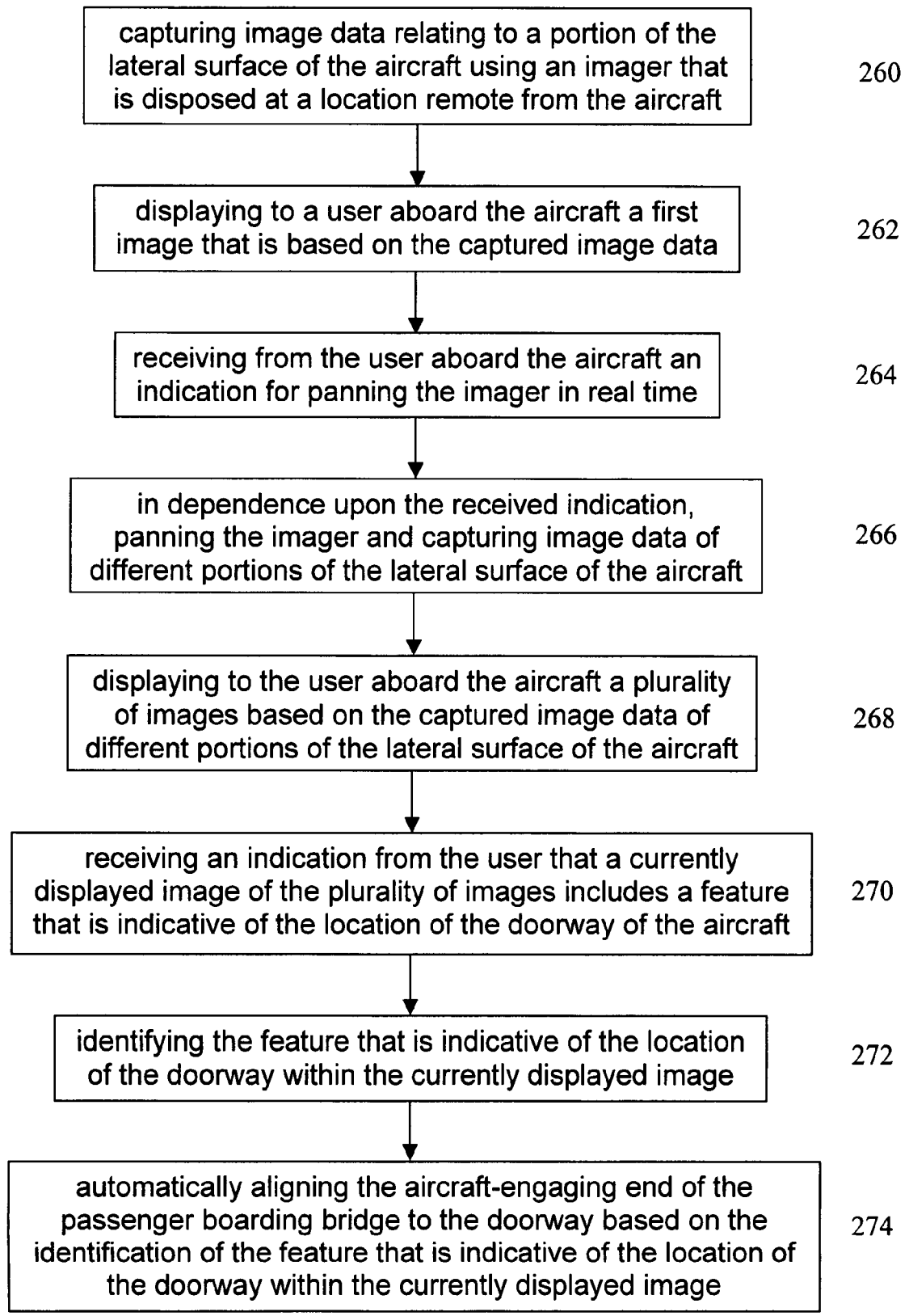
FIG. 4 is a simplified flow diagram of a method of automatically aligning an aircraft-engaging end of a passenger boarding bridge to a doorway disposed along a lateral surface of an aircraft, according to an embodiment of the instant invention.

A simplified flow diagram of a method according to one embodiment of the instant invention is shown in FIG. 3. At step 230 the imager captures image data relating to a substantial portion of the lateral surface of the aircraft. Aboard the aircraft, some of the image data is displayed to the user at step 232 whilst other parts of the image data are not displayed. The user provides at step 234 an indication for panning from the displayed image data to image data that is not displayed. Once the doorway is identified within the image data at step 236, a signal is sent back to the passenger boarding bridge at step 238. At step 240 the aircraft-engaging end of the passenger boarding bridge is aligned automatically with the doorway at the identified location. In this way, the amount of communication between the aircraft and the passenger boarding bridge is minimized. A simplified flow diagram of a method according to another embodiment of the instant invention is shown at FIG. 4. At step 260 the imager captures an image of a portion of the lateral surface that is substantially smaller than the whole lateral surface. Aboard the aircraft, the captured image is displayed to the user at step 262. The user then provides an indication at step 264, which is transmitted to a not illustrated mechanism for panning or moving the imager in real time at step 266. As the imager is panned or moved, updated image data is provided back to the user at predetermined intervals or in a substantially continuous manner at step 268. Once the user aboard the aircraft has panned or moved the imager such that it points toward a another portion of the lateral surface of the aircraft that contains the doorway, an indication is provided at step 270 and the processor attempts to determine the location of a feature indicative of the doorway at step 272. At step 274 the aircraft-engaging end of the passenger boarding bridge is aligned automatically with the doorway at the identified location. Of course, controlling the imager in real time requires an increased amount of communication between the aircraft and the passenger boarding bridge.

Optionally, once the user has positioned the doorway within the image data that is being displayed, the user in some way highlights the location of the doorway so as to facilitate identification of the location of the doorway. For instance, the user employs a pointing device such as for example a computer mouse, a trackball, a stylus, a track pad or a joy stick to trace an outline around the doorway, to place a polygon around the doorway, or to point to a feature such as the doorway window, the door handle, etc. Alternatively, the user highlights the location of the doorway by placing the doorway in the center of the image or such that a displayed "cross hair" type marking is positioned over a portion of the doorway.

Figure 5A:
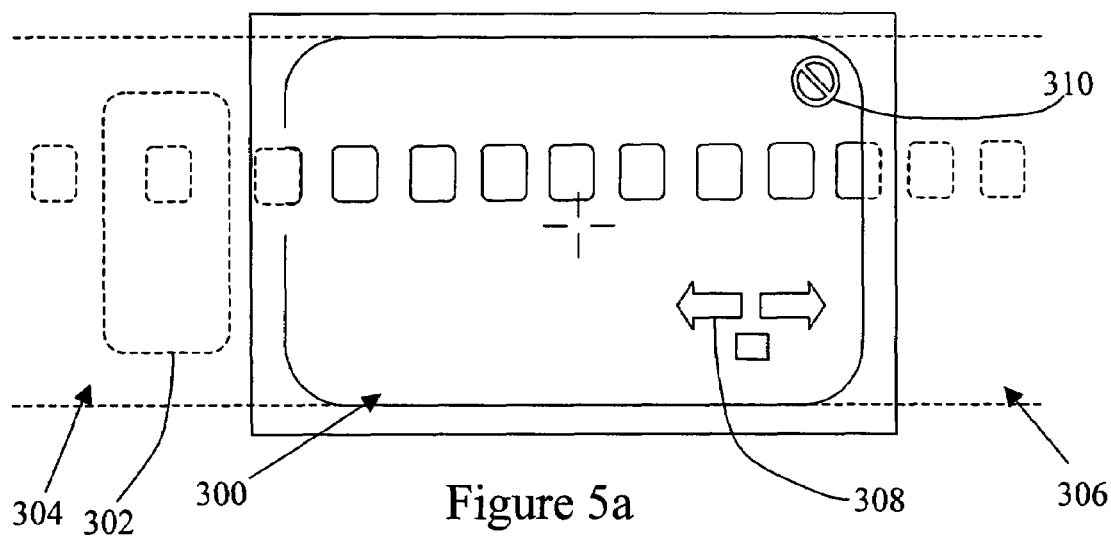
FIG. 5a is a simplified schematic diagram showing displayed image data when the feature indicative of a location of the doorway cannot be identified by the processor to within known tolerance limits.

Referring now to FIG. 5a, shown is a simplified schematic diagram showing displayed image data 300 when the feature indicative of a location of the doorway 302 cannot be identified by the processor 206 to within known tolerance limits. The image data includes displayed image data 300, as well as image data 304 and 306 that has been captured by the imager 204 and transmitted by the transmitter 210 to the receiver 214, but which is outside the limits of the displayed image data 300. For instance, the displayed image data 300 corresponds to image data that has been processed by the processor 206 in an effort to identify the feature indicative of a location of the doorway 302. The displayed image data 300 may, for example, correspond to a portion of the lateral surface of the aircraft within which the doorway 302 is expected. In the instant example, the doorway 302 does not appear in the displayed image data 300, which may be the case if the aircraft model has been incorrectly identified or incorrectly entered from a flight database. In such a case, the processor is looking for the doorway 302 within the wrong portion of the aircraft image data. In an alternate, not illustrated example, the doorway 302 actually is contained within the displayed image data 300 but, due to environmental conditions or surface markings of the aircraft, the feature indicative of a location of the doorway 302 cannot be identified to within known threshold limits.

Referring still to FIG. 5a, the image data 304 and 306 may also be viewed by the user aboard the aircraft. For instance, the user manipulates a joystick or points to directional arrows that are displayed by a touch sensitive screen, so to pan the image either left or right. In the instant example, the doorway 302 is contained within the image data 304 lying to the left of the displayed image data 300, and accordingly the user points to the left arrow 308 on the touch sensitive screen. In this case the imager has actually captured an image including the doorway but the processor is not able to determine the location of the doorway within the image. The user aboard the aircraft adjusts the displayed image such that the doorway appears within the displayed frame. Optionally, the imager captures a single image of the lateral surface of the aircraft, or the imager captures a plurality of smaller images that are "stitched" together to form one large image of the lateral surface of the aircraft.

Figure 5B:
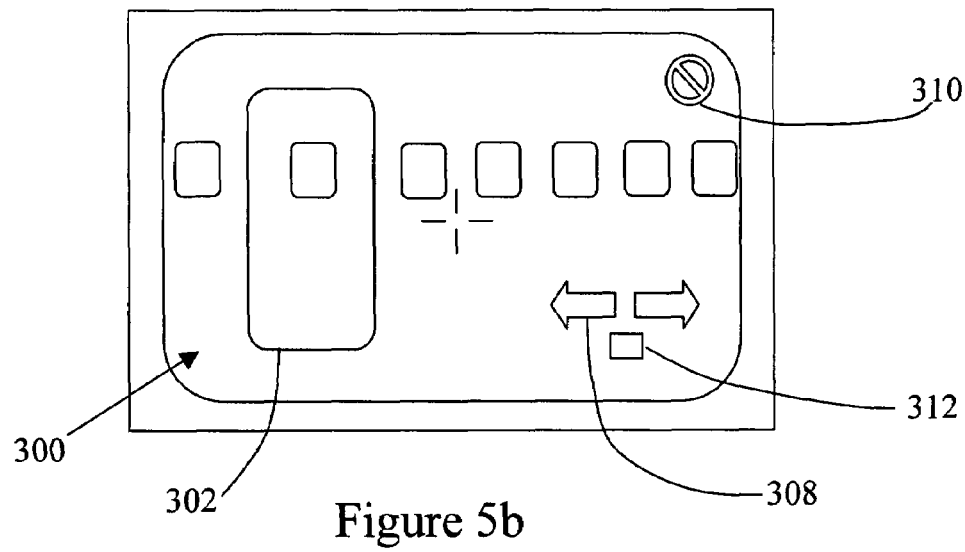
FIG. 5b is a simplified schematic diagram showing displayed image data after the user has panned the image partially toward the doorway; and, FIG. 5c is a simplified schematic diagram showing displayed image data after the user has panned the image entirely toward the doorway.

Referring now to FIG. 5b, shown is a simplified schematic diagram showing displayed image data 300 after the user has panned the image partially toward the doorway 302. Optionally, at this point the user points to the virtual button 312 to indicate that no further input data will be provided. Since the doorway 302 now appears in the displayed image data 300, there is a higher probability that the processor 206 will correctly identify the feature indicative of the location of the doorway 302. Further optionally, the user continues to depress the virtual arrow 308 to pan the image further to the left.

Figure 5C:
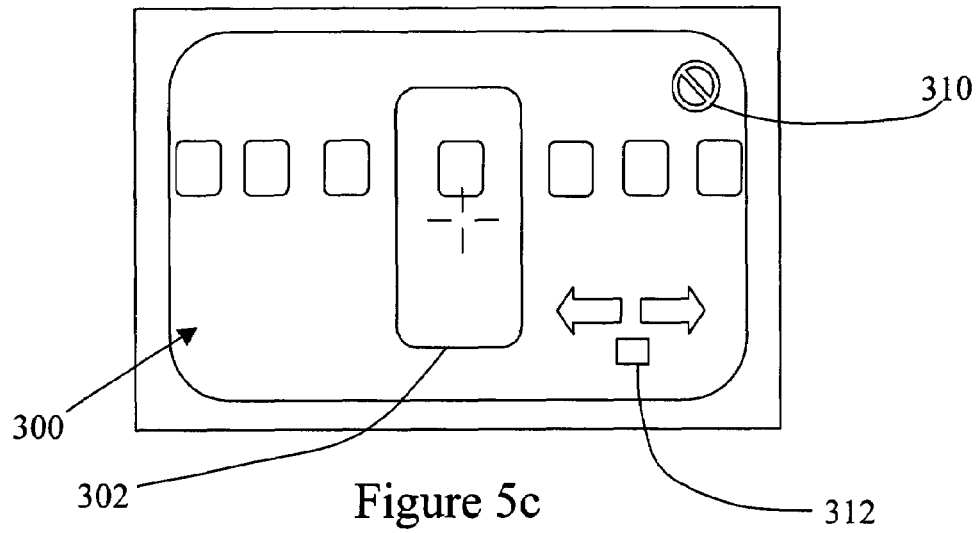

Referring now to FIG. 5c, shown is a simplified schematic diagram showing displayed image data 300 after the user has panned the image entirely toward the doorway 302. Since the doorway 302 now appears and is centered within the displayed image data 300, there is a very high probability that the processor 206 will correctly identify the feature indicative of the location of the doorway 302. The user points to the virtual button 312 to indicate that no further input data will be provided. Optionally, the user provides a further indication of the location of the doorway by, for instance, tracing an outline around the doorway or pointing to a feature that is indicative of a location of the doorway.

If the user at any time wishes to discontinue the automated bridge alignment operation, then the user points to the iconic virtual button 310 to indicate a stop command. The stop command is transmitted to the bridge controller or another receiver at the terminal building, and a human bridge operator is dispatched to complete the alignment operation manually.

Optionally, the image data 304 and 306 outside the limits of the displayed image data 300 is captured and provided for display in real time. For instance, the input signals provided by the user are transmitted directly back to the imager 204, via the receiver 212, and the imager pans in the direction that was indicated. After panning, the imager 204 captures another image and provides the updated image data for display on display device 216. Optionally, the processor 206 pre-processes the updated image data to identity the feature indicative of the location of the doorway 302. If the feature indicative of the location of the doorway 302 is identified, then automated bridge alignment proceeds. Alternatively, if the feature indicative of the location of the doorway 302 is not identified, then the updated image data is provided for display to the user and the steps described above are repeated. Optionally, the updated data continues to be provided for display by the user until the user points to the virtual button 312 to indicate that no further input data will be provided.

Numerous other embodiments may be envisaged without departing from the spirit and scope of the invention.

What is claimed is:

1. A method of aligning an aircraft-engaging end of a passenger boarding bridge to a doorway disposed along a lateral surface of an aircraft, comprising:
   capturing an image of a first portion of the lateral surface using an imager disposed at a location remote from the aircraft;
   processing data relating to the image of the first portion of the lateral surface to identify a feature that is indicative of a location of the doorway;
   when a feature that is indicative of a location of the doorway is not identified, displaying the image of the first portion of the lateral surface to a user, the user located aboard the aircraft;
   receiving from the user an indication relating to the location of the doorway relative to the image of the first portion of the lateral surface; and,
   identifying a feature indicative of a location of the doorway in dependence upon the indication from the user and the data relating to the image of the first portion of the lateral surface.

2. A method according to claim 1, wherein the indication from the user comprises an indication of a location of the doorway within the image of the first portion of the lateral surface.

3. A method according to claim 2, wherein the image of the first portion of the lateral surface is displayed using a touch sensitive screen and comprising providing an indication relating to the location of the doorway by the user pointing to a portion of the touch sensitive screen displaying a feature indicative of a location of the doorway.

4. A method according to claim 1, wherein the image of the first portion of the lateral surface and a plurality of iconic symbols, including iconic symbols for indicating a direction of the doorway relative to the image of the first portion of the lateral surface, are displayed using a touch sensitive screen.

5. A method according to claim 4, comprising providing an indication relating to the location of the doorway by the user pointing to an iconic symbol of the plurality of iconic symbols.

6. A method according to claim 5, comprising providing an indication relating to the location of the doorway by the user pointing to an iconic symbol for indicating a direction of the doorway relative to the image of the first portion of the lateral surface.

7. A method according to claim 1, wherein identifying a feature indicative of a location of the doorway in dependence upon the indication from the user and the data relating to the image of the first portion of the lateral surface comprises capturing an image of a second portion of the lateral surface, the second portion being along a direction indicated by the user aboard the aircraft.

8. A method according to claim 7, wherein the identified feature indicative of a location of the doorway is identified within the image of the second portion of the lateral surface.

9. A method according to claim 7, comprising moving the imager between a first orientation for capturing the image of the first portion of the lateral surface and a second orientation for capturing the image of the second portion of the lateral surface in dependence upon the indication from the user.

10. A method according to claim 1, comprising wirelessly transmitting data relating to the image of the first portion of the lateral surface to a display device aboard the aircraft prior to displaying the image of the first portion of the lateral surface to the user aboard the aircraft.

11. A method according to claim 1, wherein identifying a feature indicative of a location of the doorway in dependence upon the indication from the user and the data relating to the image of the first portion of the lateral surface is performed by a processor for determining a location of the doorway, and comprising providing a control signal from the processor for automatically aligning the aircraft-engaging end of the passenger boarding bridge to the doorway at the determined location.

12. A method of aligning an aircraft-engaging end of a passenger boarding bridge to a doorway disposed along a lateral surface of an aircraft, comprising:

capturing image data relating to a substantial portion of the lateral surface of the aircraft using an imager that is disposed at a location remote from the aircraft;

displaying to a user aboard the aircraft a first image that is based on some of the captured image data;

receiving from the user aboard the aircraft an indication for panning the displayed image from the first image to a second image that is based on other of the captured image data, the second image including the doorway of the aircraft;

identifying the location of the doorway of the aircraft within the image data and in dependence upon the indication received from the user aboard the aircraft;

transmitting a signal to an automated controller of the passenger boarding bridge, the signal including data relating to the location of the doorway of the aircraft within the image data; and, automatically aligning the aircraft-engaging end of the passenger boarding bridge to the doorway at the identified location.

13. A method of aligning an aircraft-engaging end of a passenger boarding bridge to a doorway disposed along a lateral surface of an aircraft, comprising:

capturing image data relating to a portion of the lateral surface of the aircraft using an imager that is disposed at a location remote from the aircraft;

displaying to a user aboard the aircraft a first image that is based on the captured image data;

receiving from the user aboard the aircraft an indication for panning the imager in real time;

in dependence upon the received indication, panning the imager and capturing image data of different portions of the lateral surface of the aircraft;

displaying to the user aboard the aircraft a plurality of images based on the captured image data of different portions of the lateral surface of the aircraft;

receiving an indication from the user that a currently displayed image of the plurality of images includes a feature that is indicative of the location of the doorway of the aircraft;

identifying the feature that is indicative of the location of the doorway within the currently displayed image; and, automatically aligning the aircraft-engaging end of the passenger boarding bridge to the doorway based on the identification of the feature that is indicative of the location of the doorway within the currently displayed image.

* * * * *